Patented Jan. 6, 1931

1,787,483

UNITED STATES PATENT OFFICE

BURRITT SAMUEL LACY, OF RED BANK, NEW JERSEY, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS FOR THE PRODUCTION OF FORMAMIDE

No Drawing.  Application filed November 17, 1925. Serial No. 69,708.

This invention relates to the formation of formamide from ammonia and carbon monoxide. While this reaction is not unknown, the literature is full of records of unsuccessful attempts and work involving the use of high pressures and expensive equipment. As an example of these unsuccessful attempts that of Meyer & Orthner, Ber. 54B 1705 (1921) at 125 atmospheres with clay as a catalyst is most conclusive. The result has been a complete lack of commercial development.

Aside from the attempts to make formamide by the direct reaction between carbon monoxide and ammonia, there have been described in the literature reactions by which it might be considered possible to obtain formamide indirectly from carbon monoxide and ammonia as the ultimate raw materials, but the conditions under which these reactions occurred were such as to discourage employing them for the commercial production of formamide. In particular, it has long been known that formamide can be made by the reaction between ethyl formate and ammonia, as follows:—

A. $NH_3 + HCOOC_2H_5 =$
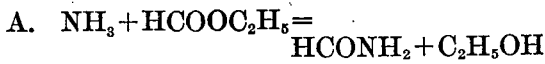

(Hofmann, Jn. Chem. Soc. vol. 16, year 1863, page 73.) So far as we are aware, the analogous reaction with methyl formate i. e.

B. $NH_3 + HCOOCH_3 = HCONH_2 + CH_3OH$ has not been described; and while one would reasonably expect it to occur, the extent and speed of the reaction could not be known beforehand. Furthermore, it has been known since 1868 (Geuther, Zeitschrift für Chemie, 1868, page 655; Chem. Centralblatt, 1868, page 632) that sodium ethylate is a catalyst for the reaction $$HCOOC_2H_5 = CO + C_2H_5OH,$$

and since 1914 (Staehler, Berichte, vol. 47, 1914, page 589) that, as might be anticipated, the reverse not only of this reaction but also of the analogous reaction with the methyl compound is catalyzed by sodium ethylate resp. sodium methylate, thus:—

C. $CO + CH_3OH = HCOOCH_3$.

However, in carrying out reaction C and the analogous reaction between ethyl alcohol and carbon monoxide, not only did Staehler use enormous pressures, but the time consumed by the operation made it very impractical for commercial use. Thus Staehler used a pressure of 300 atmospheres in reacting with ethyl alcohol to form ethyl formate, and one of 160 atmospheres in reacting with methyl alcohol to form methyl formate; while there was required a reaction period of 14 days at room temperature to produce a 45% of theory conversion of ethyl alcohol to ethyl formate, and one of 8 days (partly at 100°–120° C. and partly at room temperature) to produce an 84% of theory conversion of methyl alcohol to methyl formate. In order to obtain formamide as the end product it would, of course, then have been necessary in addition to carry out the separate operation represented by reaction A or B.

I have now discovered a simple and convenient method of producing formamide directly from carbon monoxide and ammonia. In my method I react carbon monoxide and ammonia in an alcohol, preferably methyl alcohol, as a solvent, using as a catalyst a metallic alcoholate, preferably sodium methylate, at a relatively low pressure, such as for instance 4 atmospheres. As an example of a convenient pressure at which to operate I prefer about 17 atmospheres. I have found that the speed of the reaction increases with the pressure, so that, while the reaction will take place at lower pressures I give an example of use at about 17 atmospheres. This pressure was chosen on a comparison basis of cost of apparatus for pressure work as against cost of operation due to the time of reaction. Ordinary fittings such as used for liquid ammonia processes are easily adaptable for use in my process at 17 atmospheres thus allowing a relatively high pressure at a low installation cost. I have operated successfully in an autoclave of ordinary steel, but autoclaves comprised of, or lined with other materials, for example tin, which are specially resistant to the action of the materials employed may be advantageously used. The reaction will go on more rapidly at higher pressures such as 30 to 40 atmospheres but installation costs, will of course tend to be higher. Depending on the pressure employed, the optimum reaction temperature is likewise variable, running from 50° C. and up, preferably not over 100° C., although higher temperatures may be used. I have found that a suitable temperature to use with 17 atmospheres pressure is about 70° C. Using this temperature and pressure I obtain formamide yields of 95% of theory based on the ammonia reacting. The fact that this remarkable yield was obtained, and moreover under conditions easily and economically attainable on a commercial scale is wholly unexpected in view of all previous attempts to combine carbon monoxide and ammonia to form formamide, as these had given results which were unsatisfactory in regard to yield and type of apparatus required.

To illustrate my process the following example is given:

2388 grams methyl alcohol was placed in an autoclave containing about 117 grams sodium methylate, the autoclave being provided with an efficient type of agitator so as to keep the liquid phase at all times nearly saturated with the gas and vapor present above the liquid phase. The temperature of the alcohol was now raised to about 70° C. and then ammonia and carbon monoxide were admitted rapidly till the pressure in the autoclave reached approximately 245 pounds per square inch absolute pressure, or about 16.7 atmospheres; the ammonia and carbon monoxide addition was now regulated so as to maintain this pressure. The ammonia and carbon monoxide were run in simultaneously in equimolecular proportions, this being regulated by observing the pressures of both before mixing, i. e. the ammonia pressure was 125–130 pounds per square inch and the carbon monoxide the same. The introduction of the gases was continued for 8¾ hours. It became necessary then to end the run because of the limited capacity of the autoclave. A total of 1175 grams (69.1 moles) ammonia and 1975 grams (70.5 moles) of carbon monoxide had been passed into the autoclave. The contents of the autoclave were now weighed, and found to amount to 5465 grams. The alcohol and the unreacted ammonia were then distilled off, and were available to be used in again charging the autoclave; finally the formamide itself was distilled off, preferably at reduced pressure. The amount of unreacted ammonia recovered was 87 grams or 5.1 moles, so that $69.1 - 5.1 = 64.0$ moles ammonia had disappeared; while the amount of pure formamide obtained by distillation was 2717 grams or 60.4 moles; consequently the formamide yield was $$100 \div \frac{60.4}{64.0} = 94.4\%$$

of theory referred to the ammonia which disappeared. The overall loss of 5.6% of theory includes losses in distillation, transfer, etc. as well as any possible side reactions.

At one time during this run the reaction pressure was allowed to drop to 120 pounds per square inch. It was found that during this low pressure period that the reaction continued, as shown by gas absorption, but that the speed of reaction was less.

I do not desire to limit myself to the exact conditions herein set forth since many variations are possible within the scope of my invention. While there may be no technical advantage in pressures differing widely from those I have indicated, our measurements of the equilibrium of this process show that reaction occurs to a considerable extent at any pressure over atmospheric. Similarly, wide temperature variations are permissible. The molecular ammonia-carbon monoxide ratio I have indicated at 1:1, this however is not an absolute necessity. In fact we have found that a higher reaction velocity, and consequently a greater production capacity for an autoclave of a given size, is obtainable by keeping the ammonia in considerable excess over the carbon monoxide during all but the last part of the process, when the balance of the carbon monoxide is run in. Thus in a run similar to that just given, differing however in that about ¾ of the total ammonia was run in before starting to pass in carbon monoxide, the time of the whole reaction was shortened from 8¾ hours to 3 hours.

Instead of methyl alcohol and sodium methylate as the reaction medium, ethyl alcohol and sodium ethylate may be used. The results are approximately the same, so that the reaction appears to be a general one with a medium consisting of alcohol and metal alcoholate, especially with the simpler monohydric alcohols. In the case of ethyl alcohol, the chief practical difference is that the ethyl alcohol left at the close of this reaction, since it is less volatile than the methyl alcohol, requires a correspondingly higher temperature to distill it off. Furthermore it is much less easy to remove from the ethyl alcohol water which may tend gradually to accumulate in the system; such water should be kept at a low figure in order to prevent unfavorable action on the alcoholate.

Another variation of carrying out the reaction which I have discovered may be advantageously employed is to use as the original charge of the autoclave sodium alcoholate dissloved in a mixture of alcohol and formamide, instead of sodium alcoholate dissolved in alcohol alone. This has the advantage that the separation by distillation of formamide from the alcohol and unreacted ammonia need be less sharp. Thus some formamide may be allowed to go over with the last traces of the alcohol and ammonia leaving the bulk of the formamide virtually free from these substances.

What I claim is:

1. Process for the production of formamide which consists in causing carbon monoxide and ammonia to combine in the presence of an alcohol and an alcoholate.

2. Process for the production of formamide which consists in causing carbon monoxide and ammonia to combine in the presence of an alcohol and a metal alcoholate.

3. Process for the production of formamide which consists in causing carbon monoxide and ammonia to combine in the presence of an alcohol and a sodium alcoholate.

4. Process for the production of formamide which consists in causing carbon monoxide and ammonia to combine in the presence of methyl alcohol, and sodium methylate.

5. Process for the production of formamide which consists in mixing carbon monoxide and ammonia in an alcohol containing an alcoholate and heating the mixture in a closed space under pressures above atmospheric.

6. Process for the production of formamide which consists in mixing carbon monoxide and ammonia in methyl alcohol containing sodium methylate and heating the mixture in a closed space under pressures above atmospheric.

7. Process for the production of formamide which consists in mixing carbon monoxide and ammonia in methyl alcohol containing sodium methylate and heating the mixture to a temperature between 50° C. and 100° C. in a closed space under pressures above atmospheric.

8. Process for the production of formamide which consists in mixing carbon monoxide and ammonia in methyl alcohol containing sodium methylate and heating the mixture to a temperature of about 70° C. and under a pressure of about 17 atmospheres.

9. Process for the production of formamide which consists in preparing a mixture of methyl alcohol and sodium methylate in a closed vessel, forcing ammonia into the mixture under pressure and then forcing in carbon monoxide to react with the ammonia present.

10. Process for the production of formamide which consists in causing carbon monoxide and ammonia to combine in the presence of methyl alcohol and sodium methylate, the ammonia being kept largely in excess during the larger portion of the reaction period.

11. Process for the production of formamide from carbon monoxide and ammonia in the presence of methyl alcohol and sodium methylate, characterized in that ammonia is first charged into the reaction zone then a mixture of carbon monoxide and ammonia is charged in and finally the excess of ammonia is removed by the addition of carbon monoxide alone, thereby causing ammonia to be present in excess throughout the major portion of the reaction period.

12. The process of manufacturing formamide which consists in acting on an aliphatic alcohol with carbon monoxid and ammonia, at a higher pressure than atmospheric pressure.

13. The process of manufacturing formamide which consists in acting on methanol with carbon monoxid and ammonia in the presence of metal alcoholate, at a pressure exceeding atmospheric pressure.

Signed at Perth Amboy in the county of Middlesex and State of New Jersey this 10th day of November A. D. 1925.

BURRITT SAMUEL LACY.